US010915478B2

(12) United States Patent
Chafin et al.

(10) Patent No.: US 10,915,478 B2
(45) Date of Patent: Feb. 9, 2021

(54) METHOD AND APPARATUS FOR SCATTER GATHER PROCESSING ENGINE IN A STORAGE CONTROLLER FOR CACHING APPLICATIONS

(71) Applicant: Microsemi Storage Solutions, Inc., Chandler, AZ (US)

(72) Inventors: Craig Chafin, Colorado Springs, CO (US); Arunkumar Sundaram, Folsom, CA (US)

(73) Assignee: Microsemi Storage Solutions, Inc., Chandler, AZ (US)

( * ) Notice: Subject to any disclaimer, the term of this patent is extended or adjusted under 35 U.S.C. 154(b) by 127 days.

(21) Appl. No.: 16/385,367

(22) Filed: Apr. 16, 2019

(65) Prior Publication Data
US 2019/0361825 A1 Nov. 28, 2019

Related U.S. Application Data

(60) Provisional application No. 62/675,312, filed on May 23, 2018.

(51) Int. Cl.
*G06F 13/28* (2006.01)
*G06F 12/0804* (2016.01)
*G06F 12/0891* (2016.01)

(52) U.S. Cl.
CPC .......... *G06F 13/28* (2013.01); *G06F 12/0804* (2013.01); *G06F 12/0891* (2013.01); *G06F 2212/621* (2013.01)

(58) Field of Classification Search
CPC .............. G06F 12/0804; G06F 12/0891; G06F 2212/621
See application file for complete search history.

(56) References Cited

U.S. PATENT DOCUMENTS

2016/0162422 A1  6/2016  Weber
2017/0097909 A1  4/2017  Simionescu et al.

FOREIGN PATENT DOCUMENTS

CN        101218571 B    7/2012

OTHER PUBLICATIONS

PCT/US2019/027092, International Search Report and Written Opinion of the International Searching Authority, dated Jun. 27, 2019.

*Primary Examiner* — Charles Rones
*Assistant Examiner* — Han V Doan
(74) *Attorney, Agent, or Firm* — Glass and Associates; Kenneth Glass

(57) ABSTRACT

The disclosure relates generally to improvements in caching operations in storage controllers, including caching operations utilizing direct memory access (DMA) systems, and related devices. Rather than the firmware running on the processor of the storage controller having to traverse a dirty cache sector bitmap and manipulate an original scatter-gather (SG) list in order to generate the two separate SG lists, namely one for the cache and one for the storage device, these operations are offloaded onto new specialized hardware referred to herein as a smart DMA engine in order to free up the processor of the storage controller.

20 Claims, 13 Drawing Sheets

Read Request for Sector 0 to 31 with an n element SG List

| 0 | 1 | 2 | 3 | 4 | 5 | 6 | 7 |
|---|---|---|---|---|---|---|---|
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |

502

Read/DMA Request to Cache Block with a new SG List of at least n+6 elements. SG Elements introduced, by traversing the bitmap, for trashing stale sectors Cache Block w/ Dirty Sectors tracked in a bitmap 510
512

☐ Invalid data - trash
▨ Good data - retain

Read Request to Drive with a new SG List of at least n+5 elements. SG Elements, introduced by traversing the bitmap, for trashing stale sectors Partial Stale Physical Sectors in Storage 514
516

☐ Invalid data - trash
▨ Good data - retain

FIG. 5
Prior Art sector size
512 (200 hex)

| | Host SGL (902) | BMP (904) | New SGL (906) |
|---|---|---|---|
| Ex. 1 | [1000 address (hex); 512 size (hex); -]  data size = cache sector size | 0 copy; 1; 0; 1 ← shift (904a) | [FFFF; 512; -] |
| Ex. 2 | [2000; 256; -]  data size < cache sector size | 0 copy; .; 0; 1; 0 ← no shift, take data | [2000; 256; -] |
| Ex. 3 | [3000; 256; -] | 0 copy; .; 0; 1; 0 ← shift, take data | [3000; 256; -] |
| Ex. 4 Part A | [4000; 1024; EOL]  data size > cache sector size | 0; 0; .; 0; 1 ← shift, trash | [FFFF; 512; -] |
| Ex. 4 Part B | [4200; 512; EOL]  data size > cache sector size | 0 copy; 0; .; 0; 0 ← no shift, take data | [4200; 512; EOL] |

FIG. 9

METHOD AND APPARATUS FOR SCATTER GATHER PROCESSING ENGINE IN A STORAGE CONTROLLER FOR CACHING APPLICATIONS

FIELD

The present disclosure relates to storage controller technology, and more particularly to caching operations utilizing direct memory access (DMA) systems.

BACKGROUND

Direct memory access (DMA) is a feature of a computing system that permits one or more devices to access main memory such as random access memory (RAM) independently of the computer processor. A DMA transfer essentially copies a block of memory from one device to another.

FIG. 1 shows a typical system 100 comprising a host computer 102, a storage device or system 106, and a storage controller 104 disposed between and interconnecting host 102 and storage device 106. Storage device 106 is typically a non-volatile memory but may be any suitable storage medium. Host computer 102 generally comprises an electronic processor, a memory such as random access memory, a cache, storage such as a hard disk, and various inputs/outputs (not shown). Host 102 generally runs software including an operating system and one or more device drivers. The storage controller 104 generally comprises an electronic processor, such as a central processing unit, a memory such as random access memory, and a cache (not shown), and may run firmware. Storage controller 104 may also comprise a DMA controller 105 for coordinating DMA transfer operations. The task of storage controller 104 is generally to control and access storage device 106 based on read and write commands sent from host computer 102.

A DMA transfer copies a block of memory from one device to another. The block of memory that resides in these devices may be further subdivided into smaller chunks called fragments that may not be contiguously located. For example, a 4 megabyte (MB) block may be located as 4 separate 1 MB fragments anywhere in the memory space of the device. Therefore, some information is needed on the physical locations of the fragments so that the DMA Master (the DMA controller) can then use this information to either collect the data from these separate fragments (gather) or write data into these separate fragments (scatter). This is where scatter-gather (SG) lists comprising SG elements are utilized.

An SG element contains the physical location of one memory fragment along with the size of the data contained in that fragment. A number of SG elements together can describe the locations and sizes of the fragments of memory that make up the block of data to be transferred. The format of a SG element can be different depending upon the application. FIG. 2A represents the IEEE 1212.1 compliant SG element, which is provided merely as an example.

As shown in FIG. 2A, an example SG element has the following fields: a 64-bit Address field 200 that points to the starting location of the fragment in memory; a 32-bit Length field 202 that indicates the amount of data contained in or transferrable to that particular fragment; a 31 bit Reserved field 204 that is set to zeroes; and a 1 bit Extension (Ext) field 206 that indicates whether this element is a pointer to the next SG element or a pointer to a data buffer. This Extension field 206 may be needed because the SG elements themselves may not be stored contiguously in memory. In this case, the Address field 200 of an SG element can be used to point to the location of the next SG element in the list. For such an SG element, the Length field 202 is ignored and the Ext 206 bit will be set. An SG element pointing to a data buffer may also have the Length field set to all zeroes, which can mean: that the DMA controller should ignore the contents of this element and move on to the next element in the list; or that the block is empty.

FIG. 2B shows how a SG List may be used to completely specify a block of memory in a device. As shown in FIG. 2B, Fragments 0 through 4 are located at non-contiguous and random locations in physical memory 208 (which may reside in different memory spaces). The SG list 210 however puts all of these together by having SG elements 212 that point to the starting location of each fragment. As we traverse the list, we appear to have a contiguous logical memory block, whose total size is the combined sizes of all of the fragments. An illustration of such a logical memory block 214 is shown in FIG. 2B for illustrative purposes, though it is understood not to exist physically.

Notice in the example of FIG. 2B that the SG list 210 itself is not contiguously located in physical memory. The fifth SG element of the first set of SG elements points to the next SG element in the list by using the extension capability of the SG list. Also notice that it may not be possible to traverse the list backwards. For example, it may not be possible to go back to the fifth SG element once the list is traversed to the sixth SG element, as there is no information in the sixth SG element that points back to the address of the fifth SG element.

The DMA controller 105 in storage controller 104 of FIG. 1 may have a number of SG lists in memory, each corresponding to a different logical block of memory that is involved in a data transfer. Each SG list may be identified using a unique data word, also called a descriptor. Each descriptor typically contains the starting location of a particular SG list (or SG lists) in physical memory, which physical memory contains the SG list(s) (if there are multiple separate physical memories), the total size to be transferred, and other details pertaining to that particular data transfer. This way, the processor can simply instruct the DMA controller to initiate a data transfer by giving it the descriptors. The DMA controller can then find the starting address of the first SG list using the descriptor, and then proceed to transfer data by using the information obtained from traversing the SG list.

The starting address of the SG list itself can be 64 bits (depending on the system), which could make the descriptor large. In order to conserve space on the descriptor fields, descriptor information can be stored in physically contiguous locations in memory and the descriptor itself can be used to point to this information. This memory structure is called a descriptor table. In this case, the descriptor itself can be reduced to a simple index, which can then be manipulated and then added to an offset to arrive at the location of the actual contents of the descriptor in physical memory.

FIG. 3 shows a simplified view of a SG list Cache. A typical SG list Cache contains a cache memory 300; a tag memory and tag lookup logic 302; a logic 304 handling accesses to the SG list cache; and a logic 306 handling all incoming SG list read from outside world (host or main memory, not shown). The cached SG elements are stored in the cache memory 300. When cache is requested for SG elements, first tag lookup is performed. If the required SG element is found in the cache memory (that is, the look up results in a "hit"), then the SG element is provided to the requesting agent. The lookup and fetching of the SG element is handled by the access logic 304 shown in FIG. 3. Otherwise, the required SG element is fetched from the host or main memory where the SG element is stored. The SG element read from the host or the main memory storing the SG element is appropriately written in to the cache memory. The read operation from the host or main memory and the write operation to the cache memory are handled by the read logic 306 in FIG. 3.

FIG. 4 shows an example storage controller 400, which may be used as storage controller in the system of FIG. 4. Storage controller 400 generally comprises one or more of an electronic processor 402, memory 404, a storage interface adapter 408 for interfacing with one or more storage devices 420 such as hard disks or solid state drives, a host interface adapter 410 for interfacing with a host computer 422, and possibly a DMA engine circuit module 412. Various components may be interconnected with one or more busses 418 or in any other suitable way. Memory 404 may comprise a dynamic random access memory (DRAM). Further, as shown in FIG. 1, cache 406 may be implemented using memory 404. In other words, memory 404 or at least part thereof is configured to act as a cache. However, in other embodiments, cache 406 may be implemented separately from memory 404. Storage interface adapter 408 may be any suitable type of adapter, including a Serial Attached Small Computer System Interface (SCSI) (SAS) or Serial AT Attachment (SATA) adapter. Host interface adapter 410 may be a peripheral component interconnect (PCI) or PCI express (PCIe) adapter. The processor 402 generally executes firmware.

The term "storage device" is used herein to include any suitable storage medium. Further, although the term "disk" is sometimes used herein, this term is not meant to be limited to only disk drives but rather is intended to encompass any suitable storage device, including, but not limited to a solid state drive unless explicitly indicated otherwise.

Firmware running on storage controller 400 is a caching application, meaning that the firmware utilizes cache 406. When the firmware makes a read request for sectors that include sectors stored in the cache, the read request may need to include two separate requests when one or more of the requested sectors in the cache are dirty. A dirty cache sector is a sector that has been modified (i.e. written to) in the cache but has not yet been saved to storage. The corresponding sector in storage is therefore stale, meaning no longer valid. The dirty sectors need to be read from the cache and the rest of the requested sectors are to be read from storage. Accordingly, for a read request, one request is made for the sectors stored in cache, while another request is made for the sectors stored in storage.

The firmware maintains a bitmap in order to track the dirty sectors in the cache. Whether a sector in the cache is dirty may be represented by one bit in the bitmap. When a read is requested, the firmware running on the processor may create two SG lists based on the bitmap, namely one for the cache and one for the storage, as described above. The firmware generally interleaves the two SG lists to avoid stale sectors from being read from the storage.

The firmware therefore has to traverse the bitmap and manipulate the original SG list in order to generate the two separate SG lists. These operations are performed using processor 402 of storage controller 400. Furthermore, the SG list and the bitmap, as well as copies of the SG list, are at least partially stored in cache 406 of storage controller 400. Thus the traversing of the SG list and the bitmap, and the generation of the two new separate SG lists utilizes resources of the processor 402 and cache 406 of storage controller 400.

FIG. 5 is an example of a read request that is handled by the processor of a storage controller. Firmware running on the processor traverses the bitmap and manipulates the original SG list in order to generate the two separate SG lists, namely one for the storage controller cache/memory and one for the disk. The read request is for a read of sectors 0 to 31, as shown at the top of FIG. 5. An n-element SG list (not shown) associated with the read request and a dirty sector bitmap are also used for the read request. Each of the n SG elements in the SG list corresponds to a contiguous fragment of data.

The storage controller processor generates the two new, separate SG lists using the host SG list and the dirty sector bitmap. FIG. 5 shows, at the lower left, a new SG list for the cache/memory comprising at least n+6 SG elements. White sectors 510 represent invalid data in the cache/memory to be trashed and shaded sectors 512 represent valid data to be retained. Trashing generally means that a portion of invalid or unwanted data is read as part of larger read operation but the portion of data is subsequently discarded. The additional 6 SG elements in the new SG list for the cache/memory correspond to 6 contiguous fragments of sectors of invalid data in the cache/memory, namely sectors 0-9, 11, 16-17, 21-24, 27, and 30-31.

FIG. 5 shows, at the lower right, a new SG list for the disk comprising at least n+5 SG elements. White sectors 514 represent invalid data to be trashed and shaded sectors 516 represent valid data to be retained. The additional 5 SG elements in the new SG list for the disk correspond to 5 contiguous fragments of sectors of invalid data in the disk, namely sectors 10, 12-15, 18-20, 25-26, and 28-29.

The two new SG lists are then made available to the DMA engine to fulfil the read (or write) request.

Improvements in caching operations in storage controllers are desirable.

The above information is presented as background information only to assist with an understanding of the present disclosure. No assertion or admission is made as to whether any of the above might be applicable as prior art with regard to the present disclosure.

SUMMARY

According to an aspect, the present disclosure is directed to a smart direct memory access (DMA) engine module for a storage controller, the module comprising a descriptor fetch circuit module for obtaining a DMA descriptor for a DMA read or write request to a storage device, the DMA descriptor including first address information for a host scatter-gather (SG) list and second address information for a dirty sector bitmap, the host SG list comprising one or more SG elements each including address information and size information for a fragment of memory covered by the DMA read or write request, and the dirty sector bitmap indicating dirty sectors in a cache of the storage controller having invalid data relative to corresponding sectors in the storage device, a host SG list walker circuit module configured to read information from the host SG list, a bitmap walker circuit module configured to read information from the dirty sector bitmap, a new SG list generator circuit module configured to generate at least one new SG list for the cache or for the storage device, the new SG list comprising a SG element for each fragment or portion of fragment of memory covered by the DMA read or write request comprising valid data to be read from the respective one of the cache or the storage device, the new SG list being generated based on the information read from the host SG list and the dirty sector bitmap, the new SG list being different than the host SG list, and a DMA engine circuit module configured to perform the DMA read or write based on the at least one new SG list.

In an embodiment, the new SG list generator circuit module is further configured to generate at least one trashing SG element in the new SG list for a fragment or portion of fragment of memory covered by the DMA read or write request comprising invalid data in the respective one of the cache or the storage device, the trashing SG element indicating that the invalid data read from the one of the cache and the storage device is to be trashed.

In an embodiment, the DMA engine circuit module is configured to perform the DMA read or write in part by trashing invalid data read from the one of the cache and the storage device in response to the at least one trashing SG element in the at least one new SG list.

In an embodiment, the smart DMA engine module further comprises a main circuit module in communication with and for controlling and coordinating the operations of the descriptor fetch circuit module, the host SG list walker circuit module, the bitmap walker circuit module, and the new SG list generator circuit module.

In an embodiment, the new SG list generator circuit module is configured generate a new SG list for the cache and a new SG list for the storage device.

In an embodiment, the DMA descriptor comprises a bit offset value indicating the start of bitmap information for the DMA read or write request within the dirty sector bitmap.

In an embodiment, the DMA descriptor comprises a trash polarity bit value indicating whether dirty sectors in the cache are indicated with a value of 0 or 1 in the dirty sector bitmap, and wherein the new SG list generator circuit module is configured to use the trash polarity bit value when generating the at least one new SG list.

In an embodiment, the DMA descriptor comprises a bitmap sector size value indicating the size of sectors in the dirty sector bitmap.

In an embodiment, the descriptor fetch circuit module is configured to obtain the DMA descriptor directly from a main memory of the storage controller.

In an embodiment, the smart DMA engine module is separate from a central processing unit of the storage controller.

According to an aspect, the present disclosure is directed to a storage controller device comprising a smart DMA engine module according to the present disclosure.

According to an aspect, the present disclosure is directed to a method for execution by a smart direct memory access (DMA) engine module for a storage controller, the method comprising obtaining a DMA descriptor for a DMA read or write request to a storage device, the DMA descriptor including first address information for a host scatter-gather (SG) list and second address information for a dirty sector bitmap, the host SG list comprising one or more SG elements each including address information and size information for a fragment of memory covered by the DMA read or write request, and the dirty sector bitmap indicating dirty sectors in a cache of the storage controller having invalid data relative to corresponding sectors in the storage device, reading information from the host SG list, reading information from the dirty sector bitmap, generating at least one new SG list for the cache or for the storage device, the new SG list comprising a SG element for each fragment or portion of fragment of memory covered by the DMA read or write request comprising valid data to be read from the respective one of the cache or the storage device, the new SG list being generated based on the information read from the host SG list and the dirty sector bitmap, the new SG list being different than the host SG list, and performing the DMA read or write based on the at least one new SG list.

In an embodiment, the method further comprises generating at least one trashing SG element in the new SG list for a fragment or portion of fragment of memory covered by the DMA read or write request comprising invalid data in the respective one of the cache or the storage device, the trashing SG element indicating that the invalid data read from the one of the cache and the storage device is to be trashed.

In an embodiment, the method further comprises performing the DMA read or write in part by trashing invalid data read from the one of the cache and the storage device in response to the at least one trashing SG element in the at least one new SG list.

In an embodiment, the generating at least one new SG list comprises generating both a new SG list for the cache and a new SG list for the storage device.

In an embodiment, the DMA descriptor comprises a bit offset value indicating the start of bitmap information for the DMA read or write request within the dirty sector bitmap.

In an embodiment, the DMA descriptor comprises a trash polarity bit value indicating whether dirty sectors in the cache are indicated with a value of 0 or 1 in the dirty sector bitmap, and further comprising using the trash polarity bit value when generating the at least one new SG list.

In an embodiment, the DMA descriptor comprises a bitmap sector size value indicating the size of sectors in the dirty sector bitmap.

In an embodiment, the method further comprises obtaining the DMA descriptor directly from a main memory of the storage controller.

In an embodiment, the smart DMA engine module is separate from a central processing unit of the storage controller.

The foregoing summary provides some aspects and features according to the present disclosure but is not intended to be limiting. Other aspects and features of the present disclosure will become apparent to those ordinarily skilled in the art upon review of the following description of specific embodiments in conjunction with the accompanying figures. Accordingly, the drawings and detailed description are to be regarded as illustrative in nature and not restrictive.

BRIEF DESCRIPTION OF THE DRAWINGS

Embodiments of the present disclosure will now be described, by way of example only, with reference to the attached Figures.

FIG. 5 is an example of a read request handled by a processor of a storage controller.

FIG. 9 shows different examples of walking through both a host SG list and a dirty sector bitmap to generate a new SG list.

DETAILED DESCRIPTION

Figure 1:
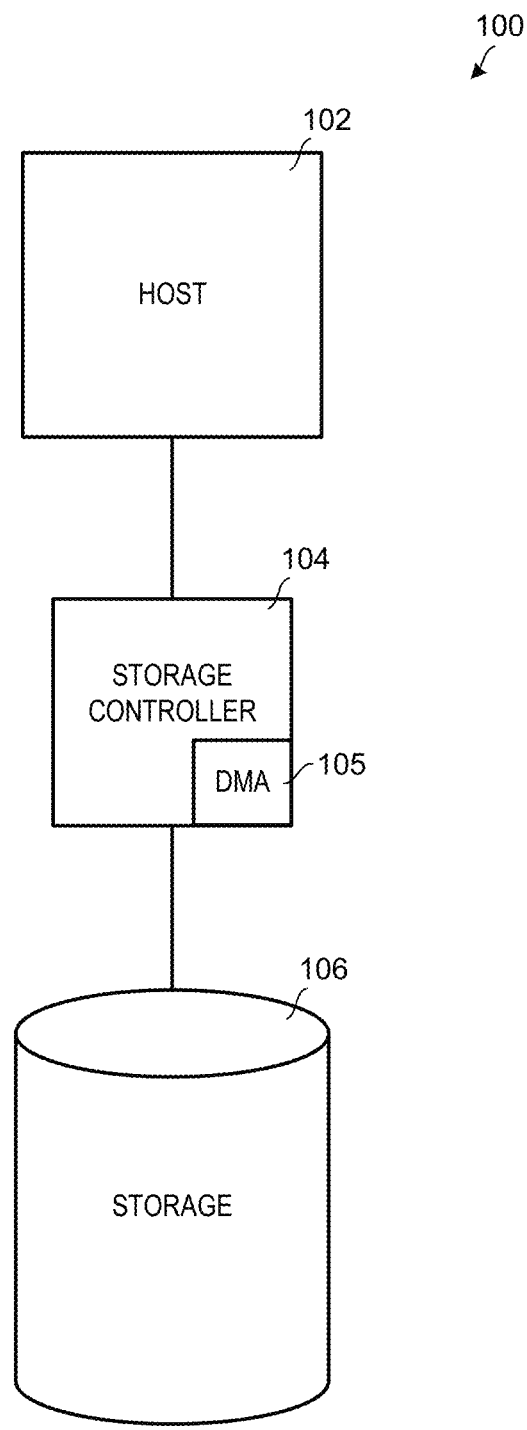
FIG. 1 is an example system comprising a host computer, a storage device, and a storage controller.
Figure 2A:
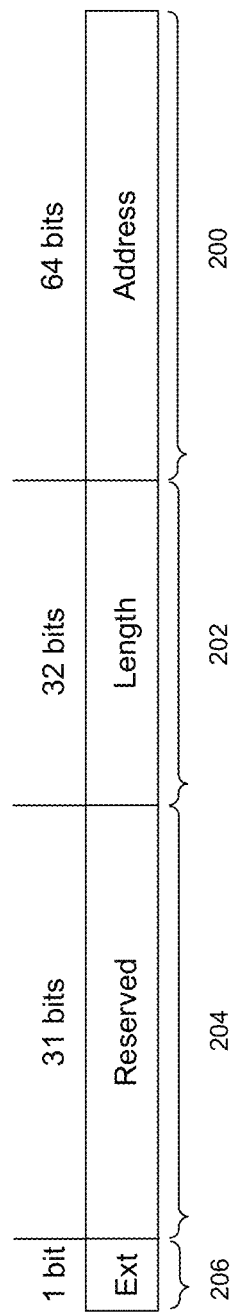
FIG. 2A is an example SG element.
Figure 2B:
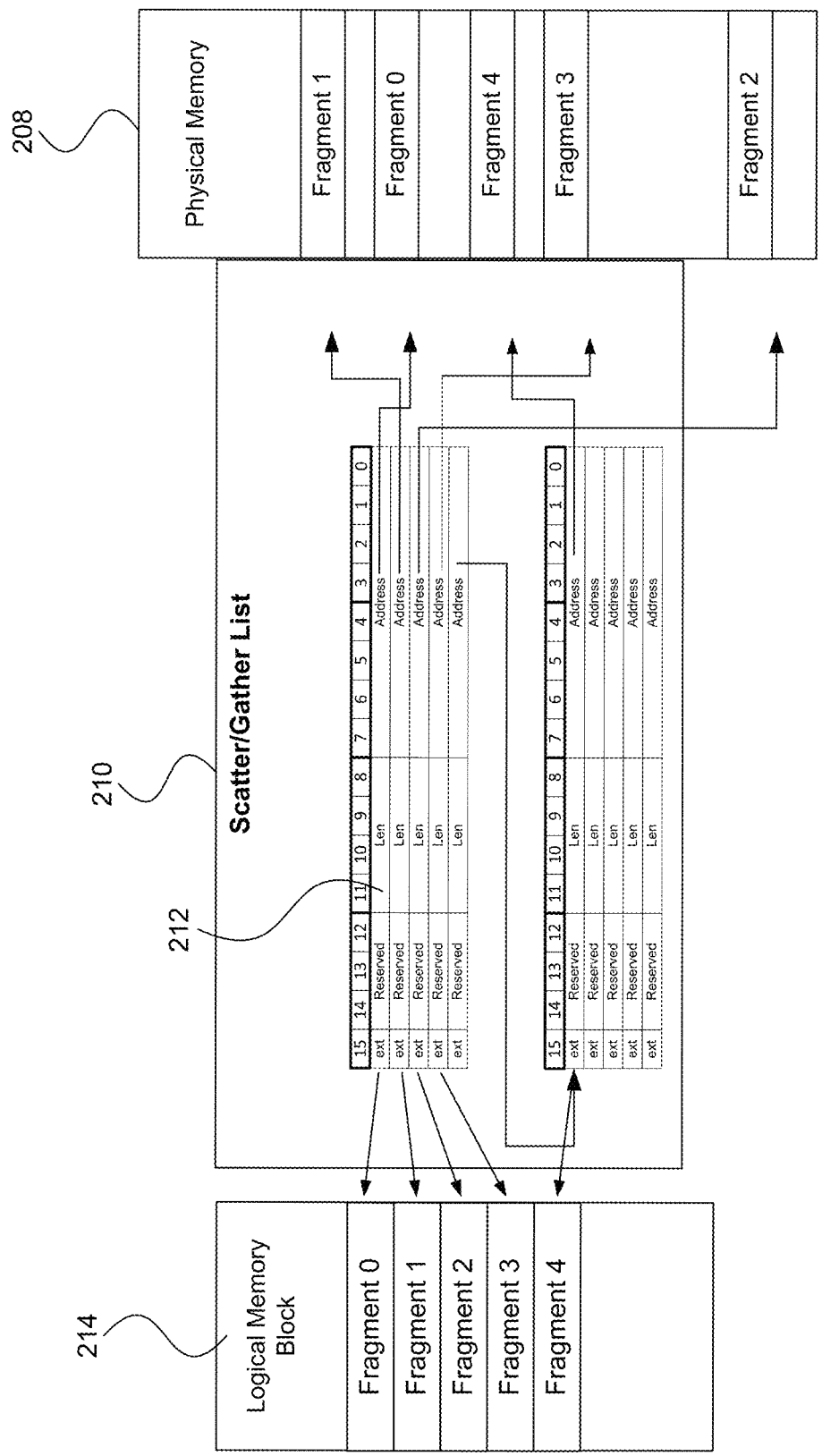
FIG. 2B is an example SG list.
Figure 3:
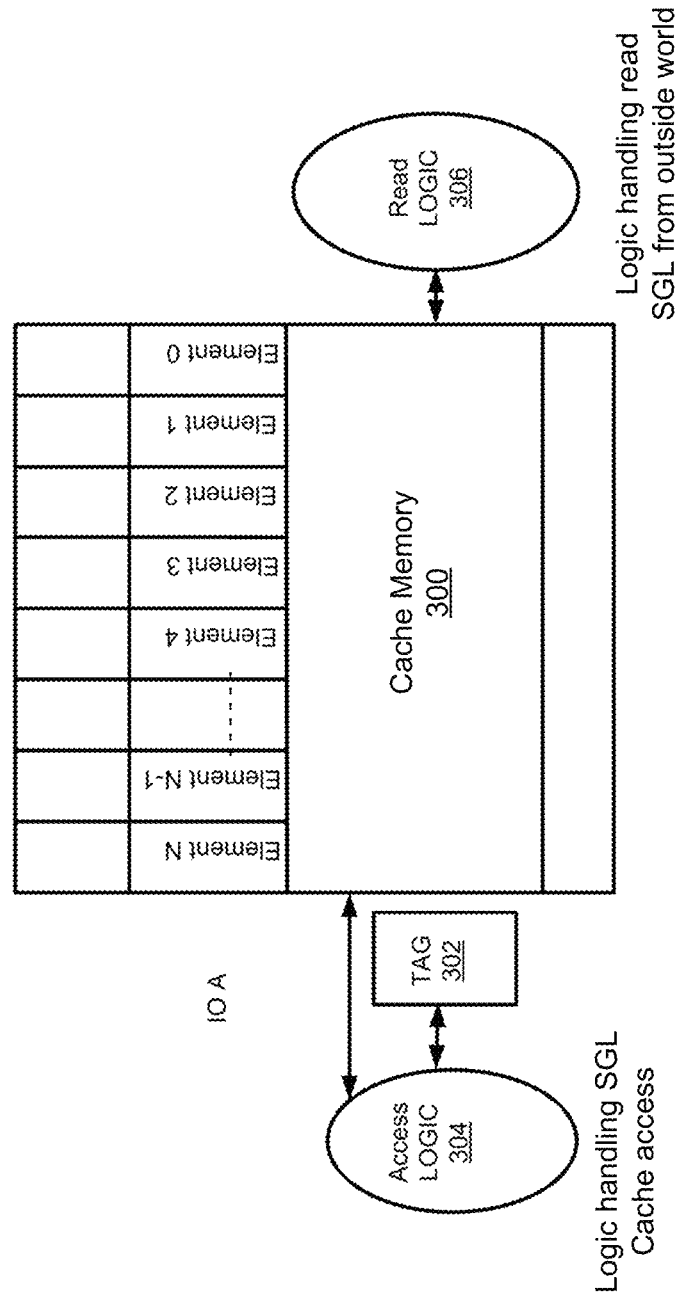
FIG. 3 is an example SG list cache.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure generally relates to improvements in computer storage controller technology, and more particularly to improvements in caching operations in storage controllers.

According to an aspect, the present disclosure is directed to a system and method in which the traversing of the bitmap, the manipulating of the original SG list, and the generation of at least one new SG list is performed in specialized hardware that is separate from the processor of the storage controller. The specialized hardware is referred to herein as a smart DMA engine. As such, aspects of the present disclosure may take the form of an wholly hardware embodiment, or an embodiment combining software (for example firmware, or other types of computer executable instructions) and hardware aspects, that may all generally be referred to herein as a "circuit," "module," or "circuit module". The software running on the processor of the storage controller may provide the smart DMA engine with the original SG list and the dirty sector bitmap. This saves software running on the processor from having to traverse the bitmap and manipulate the original SG list in order to generate the at least one new SG list. In other words, the processor may be freed up by not having to perform some or all of these operations. The smart DMA engine may form part of a larger storage controller. Further, the present smart DMA engine may be fabricated to include a conventional DMA engine, or alternatively may be fabricated to interface with a separate DMA engine such as a DMA engine already forming part of a storage controller chip.

Figure 4:
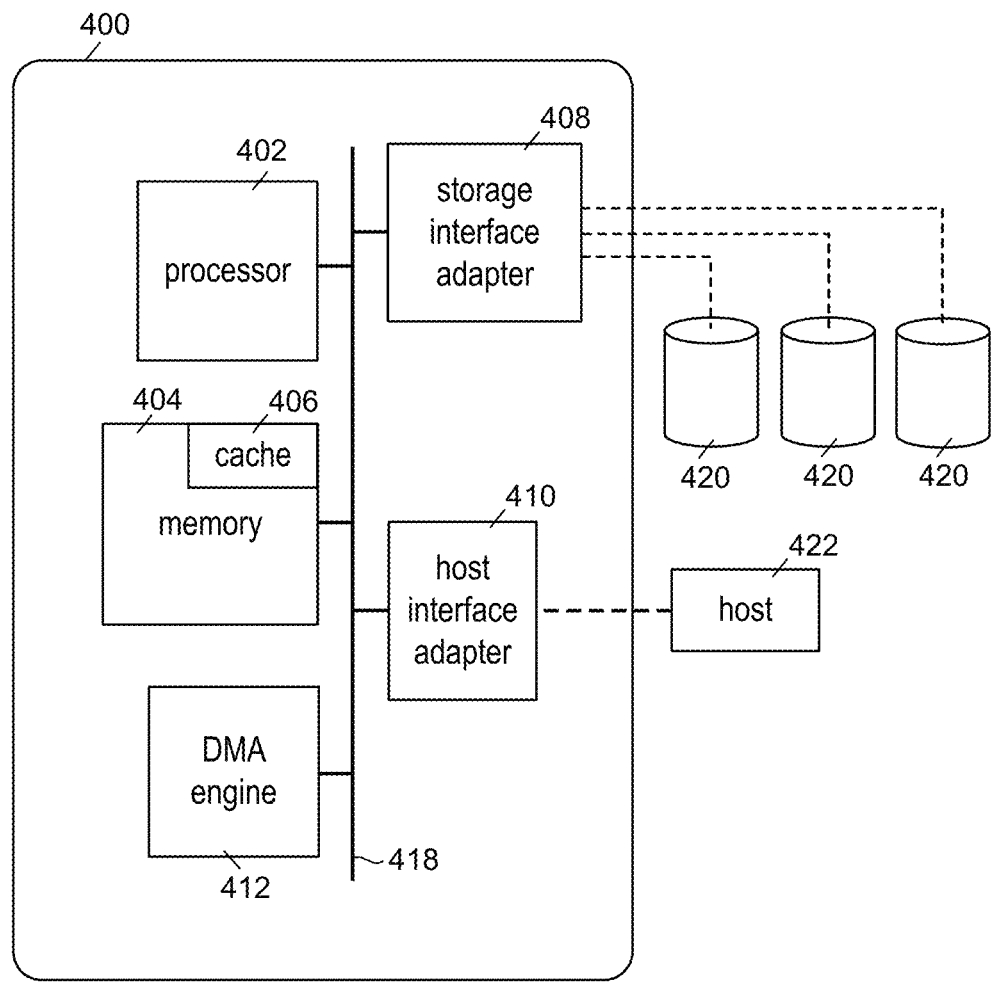
FIG. 4 is an example storage controller.
Figure 6:
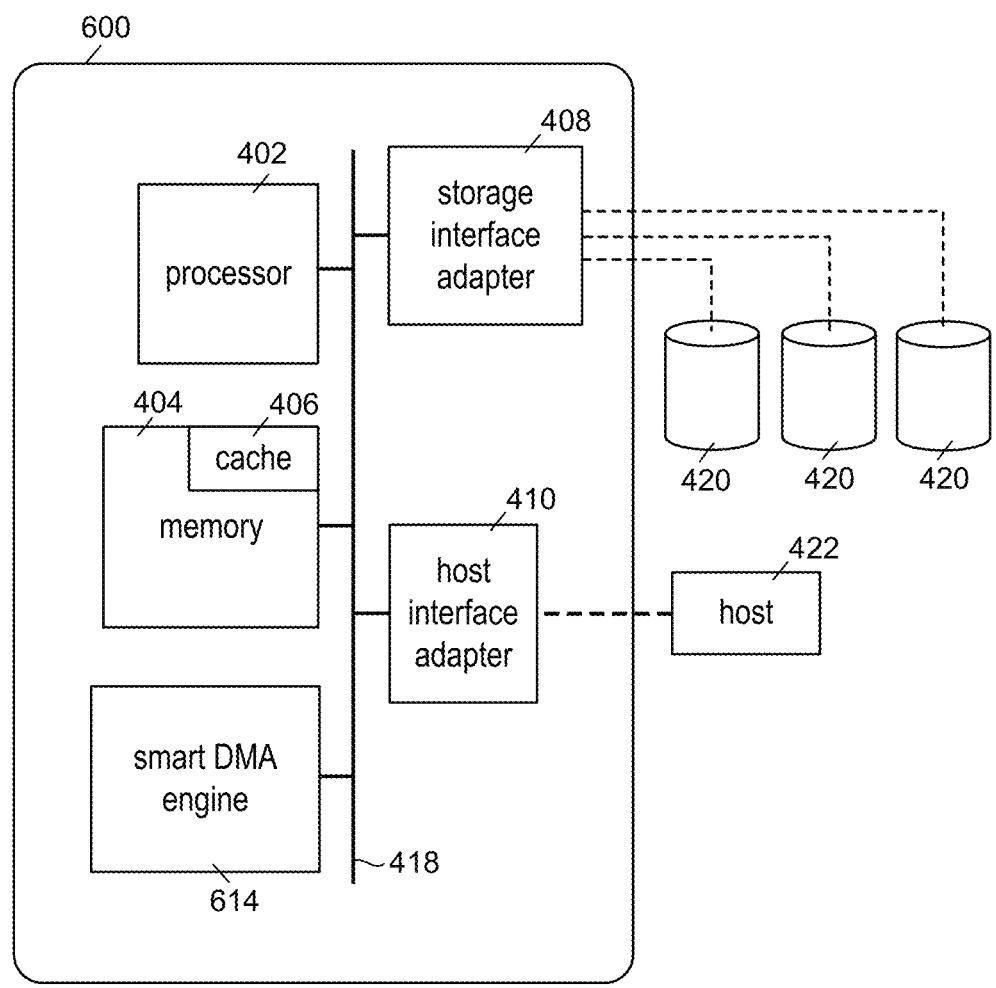
FIG. 6 is an example storage controller according to the present disclosure.

FIG. 6 shows an example storage controller 600 according to the present disclosure, which is similar to storage controller 400 of FIG. 4 except in that DMA engine circuit module 412 is replaced with smart DMA engine circuit module 614. Again, in other embodiments, the smart DMA engine circuit module may interface with a separate, non-smart DMA engine such as DMA engine 412 in FIG. 4.

Figure 7:
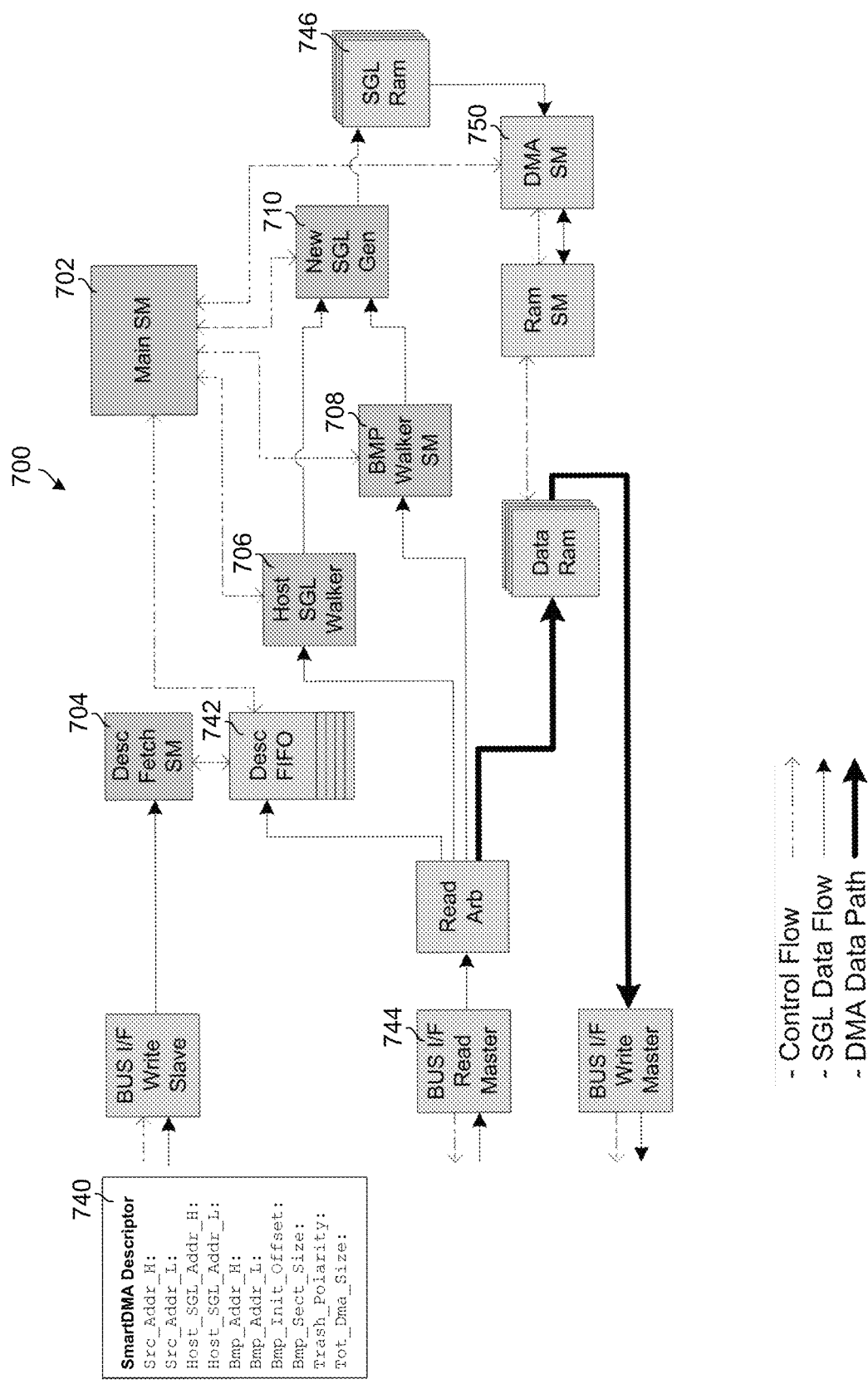
FIG. 7 is a hardware block diagram of an embodiment of a smart DMA engine.

FIG. 7 is a hardware block diagram of an embodiment of a smart DMA engine 700 according to the present disclosure. Smart DMA engine 700 generally comprises one or more of a main circuit module 702, a descriptor fetch circuit module 704, a host SG list walker circuit module 706, a bitmap walker circuit module 708, and a new SG list generator circuit module 710. The terms walker, walking and walk generally refer to reading information from a SG list or a bitmap.

The various circuit modules 702, 704, 706, 708, 710 of smart DMA engine 700 generally cooperate to, in response to a DMA read or write request, locate a host SG list and a dirty sector bitmap both managed by firmware of the storage controller, read information from both the host SG list and the dirty sector bitmap, and generate a new SG list for at least one of the cache and the storage device based on the information read from the host SG list and the dirty sector bitmap. A DMA engine circuit module 750, which is sometimes called a DMA controller or DMA master, may then perform the DMA read or write based on the new SG list to transfer the data between the host and the storage.

The various circuit modules 702, 704, 706, 708, 710 of smart DMA engine 700 are now described in more detail.

Descriptor fetch circuit module 704 is configured to obtain a DMA descriptor for a DMA read or write request to a storage device, for example storage device 420 in FIG. 6. Module 704 takes in a simple pointer (e.g. a DWORD pointer of 32 bits) from fast local processor memory in processor 402 that contains the DMA descriptor. An example DMA descriptor data structure 740 is shown in FIG. 7. DMA descriptor 740 includes first address information for a host SG list (e.g. Host_SGL_Addr_H, Host_SGL_Addr_L) and second address information for a dirty sector bitmap (e.g. Bmp_Addr_H, Bmp_Addr_L). DMA descriptor 740 may include other information, such as the source address for the read or write operation (e.g. Src_Addr_H, Src_Addr_L), a bit offset for the dirty sector bitmap (e.g. Bmp_Init_Offset), a sector size for the dirty sector bitmap (e.g. Bmp_Sect_Size), a trash polarity (e.g. Trash_Polarity), and a total DMA size (e.g. Tot_Dma_Size). The bit offset indicates the first bit in the first Dword of the bitmap from where the bitmap for the particular DMA operation starts.

The host SG list comprises one or more SG elements each including address information and size information for a fragment of memory covered by the DMA read or write request, and the dirty sector bitmap indicating dirty sectors in a cache relative to corresponding sectors in the storage device.

A purpose of descriptor fetch circuit module 704 is to reduce processor access across main bus 418 of storage controller 600. Instead of processor 402 retrieving the DMA descriptor 740 from main memory 404 and pushing it to the smart DMA engine 614, for example one DWORD at a time, descriptor fetch circuit module 704 instead pulls the descriptor data directly from main memory 404 of storage controller 600.

In some embodiments, multiple descriptors can be written at one time to a descriptor first-in-first-out (FIFO) queue 742, up to a maximum depth of the descriptor FIFO queue 742. Descriptor fetch circuit module 704 may also initiate a read cycle through a BUS interface (I/F) Read Master 744 to obtain the data locally in main memory 404 of storage controller 600 in one burst of data.

Host SG list walker circuit module 706 is configured to read information from the host SG list once the address information for the host SG list has been obtained from descriptor 740. The host SG list contains SG elements that contain an address pointer, size, and some flags such as end-of-list EOL. An EOL flag indicates that there are no more entries in the SG list to process. The SG list, or more specifically, the SG elements of the SG list, may be at least partly stored in the main memory of the storage controller.

In an embodiment (not shown), the storage controller may comprise a separate SG cache memory. One or both of DMA descriptors and SG lists, or parts thereof, may be loaded into the SG cache memory, for example from the main memory of the storage controller.

Host SG list walker circuit module 706 initiates read cycles to the BUS I/F Read Master 744 and pulls in individual SG element data. Module 706 computes the location of the next SG element, whether sequential or chained to a different address. In addition, module 706 may handle requests from main circuit module 702 to advance, continue down the host SG list, and then stop when it has reached the end. Counters may be maintained to keep track of a current host address pointer and to keep track of a current host SG element size.

Bitmap walker circuit module 708 is configured to read information from the dirty sector bitmap once the address information for the dirty sector bitmap has been obtained from descriptor 740.

In an embodiment, host SG list walker circuit module 706 may read information from the host SG list at the same time as bitmap walker circuit module 708 reads information from the dirty sector bitmap. In other embodiments, the reading of the host SG list may be done before, after, or in an interleaved fashion with the reading of the bitmap.

In effect, the dirty sector bitmap is like an SG list, except that it is only sized-based since cache block values are contiguous. Bitmap walker circuit module 708 handles loading the bitmap DWORD by initiating read cycles to the BUS I/F Read Master 744. In addition, module 708 may manage size calculations, determine when a bitmap pointer needs to be shifted, and when no more shifts are available, loads the next DWORD. Module 708 may also handle error conditions, such as ensuring the requested shift from main circuit module 702 is valid. Further, an overall size counter may be maintained. The overall size counter may be used for error checking to ensure the total size, meaning a sum of all the SG elements in the original host SG list (e.g. see SG list 1010 in FIG. 10, for an example), does not exceed a predetermined value and thereby cause an error. Further, the counter may track how much of a sector size has been used in the read or write operation relative to the sector size tracked by the bitmap. For instance, the dirty sector bitmap may have a sector size of 512 bits whereas a read or write operation may be of any size. When the size of the read or write operation is equal to or greater than the sector size tracked by the bitmap, at least one shift of the bitmap may be needed. For example, a request for a read of 1280 bits spans three bitmap sectors (each having a size of 512), therefore two bitmap pointer shifts are needed. Inputs to the bitmap walker circuit module 708 may be one or more of initial load, decrement, and a start bit from main circuit module 702. Outputs may be one or more of trash-or-not, current dirty sector bitmap size, and an output valid signal for handshaking communication.

New SG list generator circuit module 710 is configured to generate a new SG list for the cache, a new SG list for the storage device 420, or a new SG list for the cache and a new SG list for the storage device. The new SG list comprises a SG element for each fragment or portion of fragment of memory covered by the DMA read or write request comprising valid data to be read from the one of the cache and the storage device. This data is valid in the sense that it is not stale. The new SG list or lists are generated based on the information read from the host SG list and the dirty sector bitmap. In at least an embodiment, the new SG list is different than the host SG list.

Further, in an embodiment, new SG list generator circuit module 710 may generate at least one trashing SG element in the new SG list for a fragment or portion of fragment of memory covered by the DMA read or write request comprising invalid data in the respective one of the cache or the storage device. This data is invalid in the sense that it is stale. The trashing SG element indicates that the invalid data read from the one of the cache and the storage device is to be trashed by the storage controller. In an embodiment, new SG list generator circuit module 710 generates a trashing SG element in the new SG list for every fragment or portion of fragment of memory covered by the DMA read or write request comprising invalid data in the respective one of the cache or the storage device.

The one or more new SG lists may be written to a local SG list RAM 746. A new SG list may built in RAM 746, meaning the new SG list is built by adding new SG elements one at a time as the host SG list and bitmap are walked.

New SG list generator circuit module 710 may have an address calculator and a size calculator that may copy or split an SG element depending on conditions from main circuit module 702. Addresses may be nullified (0xFFFF) for trash buffers depending on data from bitmap walker circuit module 708. Size values may be computed for all SG elements. The one or more new SG lists are provided to DMA engine circuit module 750. In an embodiment, the one or more new SG lists are constructed in an at least partly optimized format, which may include collapsing contiguous portions of SG elements (e.g. 512 byte SG elements) into a single SG element.

Main circuit module 702 is, in at least one embodiment, the overall brain of smart DMA engine 700. In particular, module 702 manages the other circuit modules 704, 706, 708, 710. For instance, module 702 drives the descriptor fetch circuit module 704 when there is work to be done, for example upon receipt of a read or write request by smart DMA engine 700. Module 702 informs host SG list walker circuit module 706 to load the first SG element of the host SG list and start walking, meaning start reading information from the host SG list. Module 702 directs bitmap walker circuit module 708 to load the dirty sector bitmap, initialize calculations, and start shifting. Module 702 directs new SG list generator circuit module 710 to either copy the current SG element or split the SG element into different sized chunks. This process may be repeated until the end-of-list is detected by host SG list walker circuit module 706. Once enough of the new SG list or SG lists is generated, module 702 directs the DMA engine circuit module 750 to start moving data (i.e. performing read or write operation). In other words, the DMA operation may be started before the new SG list is fully generated. Further, any parallel optimization work that may be utilized may be managed by main circuit module 702.

Smart DMA engine 700 described herein and shown in FIG. 7 is only an example embodiment and is not meant to be limiting. For example, one or both of the functionalities and the circuitry for implementing the circuit modules 702, 704, 706, 708, 710 may be combined and/or divided into any suitable number of circuit modules. In other words, the present disclosure is not limited to a smart DMA engine having the specific circuit modules 702, 704, 706, 708, 710 described and illustrated herein. Rather, the functionalities and/or the circuitries of smart DMA engine 700 may be subdivided into one or more circuit modules in any suitable manner. Further, in an embodiment, some of the functionality of the smart DMA engine may be implemented in software.

Figure 8:
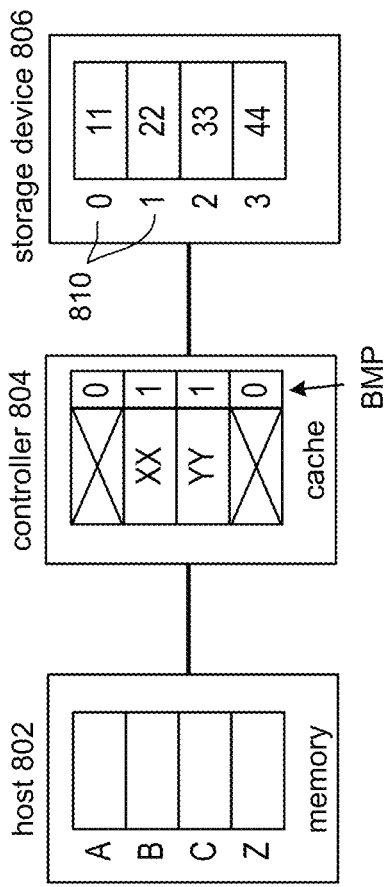
FIG. 8 depicts different example implementations of a read operation.

The concepts of trashing and trash polarity, which are utilized in embodiments of the smart DMA engine according to the present disclosure, are now explained with reference to FIG. 8. FIG. 8 depicts different example implementations of a read operation. The example read operation is a 2 kB read input/output (I/O) from a storage device, for example storage device 420 of FIG. 6, to memory of a host using DMA. The disk sector size is 512 bytes. The locations where the data is stored are sequential in the host memory and the disk. Also, it is assumed that there was previous traffic and this example is just a snapshot of one read event in a live system. This example was contrived to be as simple as possible for ease of explanation. For example, buffers, disk sectors, etc. are intentionally aligned.

FIG. 8 shows a host 802 connected to a storage device 806, such as a disk, via a storage controller 804. The read operation involves a read request to move 2 kilobytes (kB) of data spanning four sectors 0-3 from a storage device (e.g. disk 806) to the memory of a host 802. Thus each sector has a size of 512 bytes, although the sector size may be different in a different read or write. Host 802 host has no knowledge of disk 806. As far as host 802 knows, disk 806 could be a plurality of independent disks. However, host 802 only sees one large storage device. Controller 804 manages this abstraction for host 802. The memory of host 802 is a buffer staging area that is used by storage controller 804. In at least an embodiment, a key concept is that disk 806 and the memory of host 802 are "block devices", meaning they are at optimal efficiency when accessed in chunks of data that are streamable.

FIG. 8 represents a snapshot, prior to the read operation, of the state at a memory of host 802, in the cache of a storage controller 804, and in a storage device (e.g. a disk 806). Host 802 memory addresses where host 802 wishes to store the 2 kB of data being requested is specified in a SG list. These addresses are conceptualized as A, B, C, and Z in the example. Thus the requested data is to be read into sectors A, B, C and Z of the memory of host 802. Sectors A, B, C and Z can be anywhere in the memory of host 802. They do not have to be contiguous. Host 802 only wants correct data to appear in these locations. Each sector is 512 bytes, or one quarter of the overall request. Host 802 has no knowledge of how storage controller 804 will accomplish the read. Host 802 merely sends the read request and moves on leaving the details to storage controller 804. The host SG list is built by a host driver and no storage controller 804 involvement is required.

In the cache of storage controller 804, two cache entries are invalid as indicated by the crosses through the boxes while two cache entries (each 512 bytes) are valid as indicated by example values 'XX' and 'YY'. Dirty sector bitmap values are shown beside each cache entry, where a '1' indicates the data is valid whereas a '0' indicates that the data must be fetched from memory or storage. The bitmap may be organized into a structure such as a 32-bit DWORD. In disk 806, four 512 bytes sectors are shown containing data '11', '22', '33', and '44'. Each sector is stored in a different logical block address (LBA) 810, namely LBAs 0-3.

In a first example implementation, Example 1, the read is performed by storage controller 804 one sector at a time by issuing four sector read requests. These four reads are shown as four steps 1-4 in FIG. 8. In a first step, step 1, storage controller 804 attempts to read sector 0 from the storage controller cache. A valid copy of sector 0 data is not located in cache, as indicated by the value '0' in the dirty sector bitmap, therefore the cache read results in a miss. As a result, sector 0 data '11' is retrieved from disk 806 and is read into sector A in the memory of host 802.

In step 2, storage controller 804 attempts to read sector 1 from the storage controller cache. A valid copy of sector 1 data is located in the cache, as indicated by the value '1' in the dirty sector bitmap, therefore the cache read results in a hit. Sector 1 data 'XX' is retrieved from the cache of storage controller 804 and is read into sector B in the memory of host 802. In step 3, sector 2 data 'YY' is read from the cache (i.e. cache hit) into sector C in the memory of host 802. In step 4, there is a cache miss and therefore sector 3 data '44' is retrieved from disk 806 and is read into sector Z in the memory of host 802. After step 4, storage controller 804 notifies host 802 that the 2 kB read request has been completed.

The above described first example implementation of the read operation is suboptimal for block devices such as RAM memory and disk drives. Two separate read commands have to be issued to both the cache of controller 804 and to the disk 806. For block devices, there is a certain amount of fixed overhead involved in issuing a command. This overhead can be a significant source of latency, and may be as long as the request itself for small sized read or write operations. For rotating media, the disk head may have to seek to the location multiple times, or the memory will have to open or close banks of storage multiple times. Further, the controller cache may be checked on every command. In the above example, this overhead is duplicated twice for the disk (e.g. two reads from disk 806) and duplicated four times for the memory (e.g. four read attempts in the cache of storage controller 804).

In a second example implementation, Example 2, the read is performed in a more efficient way.

Given that the devices involved are block storage devices and the data to be read is sequential, a more efficient way to perform the read is to issue read commands to fetch more data and then simply throw away any data that was not requested in the read request. In this way, the overhead of each block device is incurred only once. The throwing away of data may be referred to as "trashing", "trash buffering", or "bit bucketing". A key point of trashing is that more data is read than what is actually required in order to fulfil the read request. This may seem counter intuitive as being faster, however obtaining extra data after the overhead of getting access is far smaller than re-establishing the connection.

In Example 2, the read is performed by storage controller 804 by issuing two read requests, namely one to the cache of memory controller 804 and one to disk 806. These two reads are shown as two steps, namely 1A and 2A, in FIG. 8.

In step 1A, storage controller 804 issues a 2 kB read to disk 806. Storage controller 804 knows in advance that it is possible that some of the retrieved data will be trashed. A 2 kB read to LBA 0 is issued and all the data comes back in one shot for LBAs 0 through 3. The DMA engine may handle this concept as it writes back to host memory, but there is no penalty to re-open the connection to disk 806 or the cache of memory controller 804. In step 1A, data '22' and '33' from LBAs 1 and 2, respectively, are trashed, while data '11' and '44' from LBAs 0 and 3, respectively, are read into sectors A and Z in the memory of host 802, sequentially.

In step 2A, storage controller 804 issues a 2 kB read to the cache of memory controller 804, overlapping the dirty valid bit as the DMA operation progresses through the cache. The dirty sector bitmap tells the DMA to trash the first cache entry (marked with a cross through the box), retain the second and third cache entries (having data 'XX' and 'YY' respectively), and trash the third cache entry (marked with a cross through the box). As a result, the data 'XX' and 'YY' are read into sectors B and C in the memory of host 802.

After both steps 1A and 2A are done, storage controller 804 may notify host 802 that the 2 kB read request has been completed.

In an embodiment, steps 1A and 2A may be issued at or near the same time in parallel since the block devices being accessed are different. Host 802 may be able to handle DMA accesses from two different agents at the same time.

The concept of trash polarity is now described.

In FIG. 8, the result column for Example 2 indicates which data is trashed, as explained above. The trash-or-not may be conceptualized as a binary value. For step 1A, this may be represented as 4'b0110 (disk read), where '0' means the data is retained and '1' means the data is trashed. Note this is the same as the dirty sector bitmap of the cache of storage controller 804. For step 2A (memory read), the trash-or-not binary values are 4'b1001. Here, '0' means the data is trashed while '1' means the data is retained. Note the trash-or-not values for step 2A are the exact opposite as for step 1A. This inverse property may be referred to as "trash polarity". Depending on the target device selected (e.g. disk 806 or cache of storage controller 804), the trash polarity value may be used to quickly and easily select which data to trash and which data to retain. Another potential benefit of the trash polarity model is that the same SG list may be used for the reads to both the cache of storage controller 804 and disk 806 so long as the trash polarity is known.

In the two examples of FIG. 8, the size of the data fragments covered by the DMA read request and represented in the host SG list aligned perfectly with the size of the cache entries in the cache of storage controller 804 (e.g. the DMA request contained 4 sectors, and the cache entries are each one sector in size). However, complexity arises when the size of the data fragments covered by the DMA read request do not align with controller cache memory size. This happens occurs frequently as the host driver memory page size is often different than the cache block size.

The generation of a new SG list by the storage controller according to an embodiment is now described with reference to FIG. 9. The new SG list is generated for one of the storage device (e.g. disk) or the cache/memory of the storage controller. A new SG list is generated based on the information read from the host SG list and the dirty sector bitmap. The new SG list is typically, but not necessarily always, different than the host SG list.

FIG. 9 shows four different examples of walking through both the host SG list and the dirty sector bitmap to generate a new SG list for the storage controller memory/cache. These are operations that may be performed by a combination of host SG list walker circuit module 706, bitmap walker circuit module 708, and new SG list generator circuit module 710 of smart DMA engine 700 illustrated in FIG. 7.

The four examples in FIG. 9 illustrate various ways of dealing with different SG element data sizes relative to the cache sector size. For example, if a SG element data size spans multiple sectors, then multiple bits from the dirty sector bitmap will need to be read, possibly one at a time, in order to know whether the corresponding data for each sector is in the cache and whether it is dirty.

FIG. 9 shows the content and state of a host SG element 902 in a host SG list, a portion of a dirty sector bitmap 904 along with a current bitmap pointer 904a position (represented as an arrow), and a new SG element 906 for the new SG list. In these examples, the cache sector size is 512 bytes, the value '0' in the dirty sector bitmap indicates the data in the cache is valid (i.e. not stale) and thus is to be retained, and the value '1' in the bitmap indicates the data in the cache is invalid and thus is to be trashed. Further, a counter may be used to track how much data that is covered by a single bit in the dirty sector bitmap has been processed. Once all of the data covered by a single bit in the bitmap has been processed, bitmap pointer 904a is shifted to a different bit (e.g. a next bit) in the bitmap.

In Example 1, host SG element 902 contains a source address pointer for the read operation 0x1000, and a size value of 512 bytes indicating the length of the data. The dash '-' indicates that host SG element 902 is not the last SG element in the SG list In Example 1, the size of the data indicated in host SG element 902 (512 bytes) equals the size of the cache sector (512 bytes). Dirty sector bitmap pointer 904a is pointing at a value of '1', which indicates that the data in the storage controller cache/memory is to be trashed. Example 1 is an SG element copy opcode including a bitmap pointer shift since the data size is the same as the cache sector size. Again, whether a shift should be performed may be tracked using a counter. The counter may be initially loaded with the data size of 512 and then compared to the cache sector size of 512. In this example, since the counter value is the same or greater than the cache sector size, a bitmap pointer shift is necessary. A null address in the form of 0xFFFF is written to new SG element 906, with size of 512, indicating to the DMA engine that this data should be trashed. In this regard, new SG element 906 comprising the null address may be referred to as a trashing SG element.

In Example 2, the size of the data indicated in host SG element 902 (256 bytes) is less than the size of the cache sector (512 bytes). Dirty sector bitmap pointer 904a is pointing at a value of '0', which indicates that the data in the storage controller cache/memory is to be retained. Example 2 is an SG element copy opcode, but with no bitmap pointer shift since the counter is loaded with the value of 256, which is less than the cache sector size of 512. A valid address of 0x2000 from the host SG element 902 is written to new SG element 906, with the size of 256, indicating to the DMA engine that this data should be retained.

In Example 3, the size of the data indicated in host SG element 902 (256 bytes) is less than the size of the cache sector (512 bytes). Dirty sector bitmap pointer 904a is pointing at a value of '0', which indicates that the data in the storage controller cache/memory is to be retained. Example 3 is an SG element copy opcode. However, here the previous counter value is 256 and then the current data size is added to bring the counter to 512. Since the counter value is the same or greater than the cache sector size, a bitmap pointer shift is necessary. A valid address of 0x3000 from the host SG element 902 is written to new SG element 906, with the size of 256, indicating to the DMA engine that this data should be retained.

In Example 4, the size of the data indicated in host SG element 902 (1024 bytes) is greater than the size of the cache sector (512 bytes). As a result, this is an SG element split opcode, meaning that host SG element 902 is to be split into multiple SG elements in the new SG list. This splitting is represented in FIG. 9 in two parts A and B.

In part A, dirty sector bitmap pointer 904a is pointing at a value of '1', which indicates that the data in the storage controller cache/memory is to be trashed. A null address in the form of 0xFFFF and the maximum cache sector size of 512 are written to new SG element 906. Thus SG element 906 is a trashing SG element. Also, the counter is loaded with the value 512. Since the counter value is now the same as the cache sector size, a bitmap pointer shift is necessary. Further, the host address is incremented by the maximum sector size of 512 bytes Thus from part A to part B, the host address is increased from 0x4000 to 0x4200, where the increase of 0x200 (hex format) is the same as 512 bytes (decimal format). Further, the host size is decremented by the same amount, namely 512 bytes Thus from part A to part B, the host size is decreased from 1024 bytes to 512 bytes The EOL status is maintained.

Part B begins with the updated host SG element address and updated host SG element size. Dirty sector bitmap pointer 904a is pointing at a value of '0', which indicates that the data in the storage controller cache/memory is to be retained. The updated SG element size is equal to the cache sector size of 512 bytes thus this is a copy opcode. Further, no more bitmap pointer shifting is required since the EOL flag in SG element 902 is detected. A valid address of 0x4200 from the host SG element 902 is written to new SG element 906, with the size of 512, indicating to the DMA engine that this data should be retained. The EOL flag is also copied to new SG element 906.

In the above examples described with reference to FIG. 9, the new SG list is generated specifically for one of the storage device (e.g. disk) or the cache/memory of the storage controller. Another new SG list may also be generated specifically for the other of the storage device (e.g. disk) or the cache/memory of the storage controller. This other new SG list may be generated in the same or a similar way except that the meaning of the dirty sector bitmap values of '0' and '1' are reversed. For example, for the storage device, the value '0' may mean retain the data while for the storage controller memory/cache a '0' would mean to trash the data. Further, as previously mentioned, the two new SG lists may be generated partly or fully in parallel.

Figure 10:
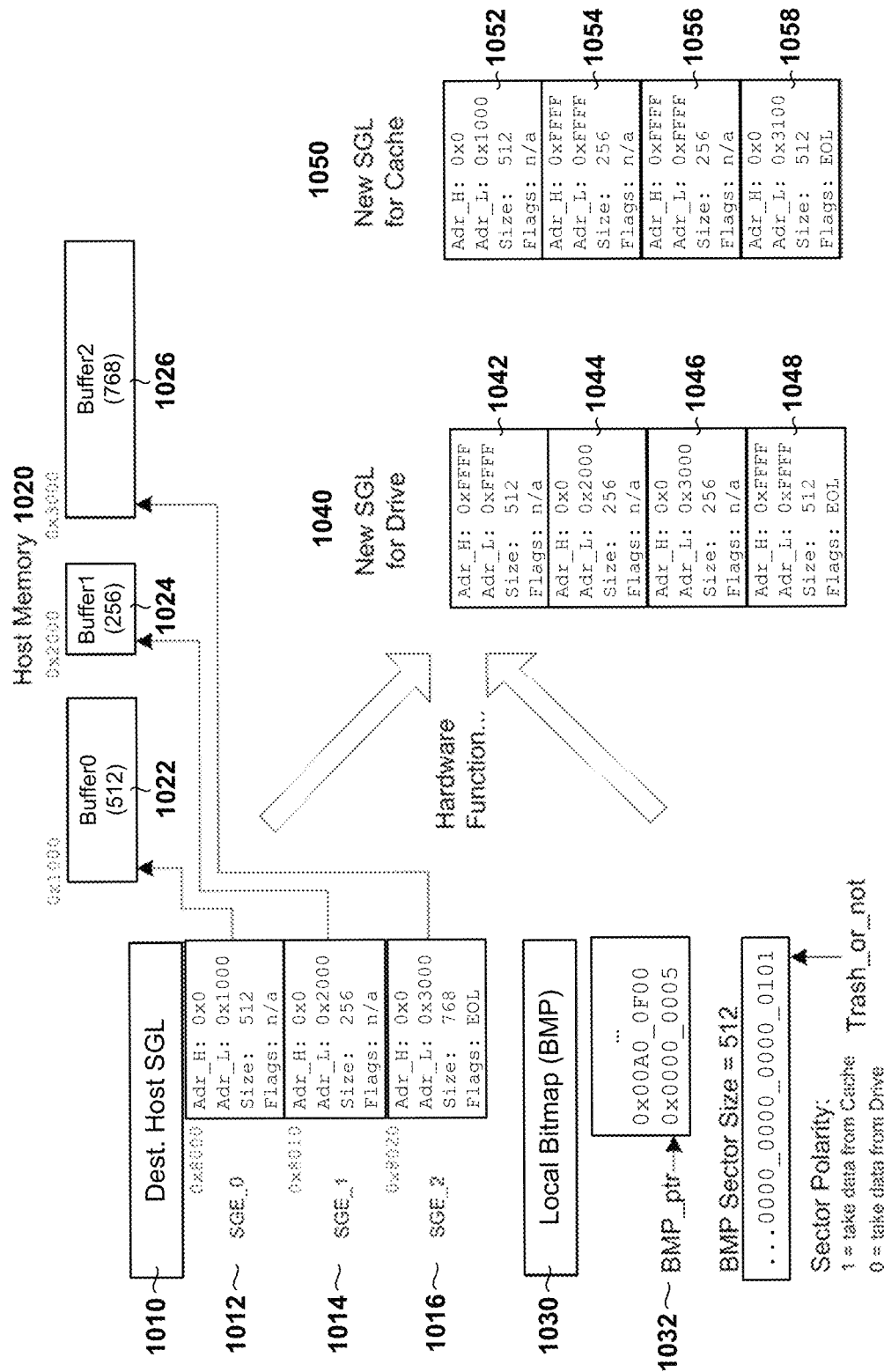
FIG. 10 shows an example of walking through both a host SG list and a dirty sector bitmap to generate two new SG lists.

FIG. 10 shows another example of walking through both a host SG list and a dirty sector bitmap to generate two new SG lists for the storage controller memory/cache and a storage device (e.g. a disk). Again, these are operations that may be performed by a combination of host SG list walker circuit module 706, bitmap walker circuit module 708, and new SG list generator circuit module 710 of smart DMA engine 700 illustrated in FIG. 7.

In the example, a destination host SG list 1010 is shown with three SG elements SGE_0 1012, SGE_1 1014, and SGE_2 1016, each representing a fragment of the data to be transferred. Note that the SG elements indicate different fragment sizes, namely 512 bytes 256 bytes and 768 bytes respectively. Further, SGE_2 1014 has an end of line (EOL) flag indicating it is the last SG element.

A local dirty sector bitmap 1030 is also shown along with a bitmap pointer 1032. The bitmap sector size is 512 bytes Pointer 1032 points to hex value 0x0000_0005, which is shown below in FIG. 10 in binary form 0000_0000_0000_0101. The least significant bit '1' in the binary number '101' representing the bitmap values corresponds to first SG element SGE_0 1012. The next least significant bit '0' corresponds to second SG element SGE_1 1014. The next bit '1' corresponds to third SG element SGE_2 1016.

A host memory 1020 is also illustrated representing the data fragments for the transfer to be stored in buffers 1022, 1024, 1026. The shown starting addresses of each buffer correspond to the address values in each of the SG elements (e.g. 0x1000, 0x2000, 0x3000).

The sector polarity of the bits in the bitmap 1030 is that '1' indicates that the data is to be obtained from the storage controller cache while '0' indicates that the data is be obtained from the storage device. In other embodiments, the sector polarity may be reversed.

FIG. 10 further shows two new SG lists 1040, 1050 for a storage device (such as storage device 420 in FIG. 6) and a storage controller memory/cache, respectively, that may be generated by a new SG list generator circuit module according to the present disclosure.

The new SG list generation process may be as follows. A host SG list walker circuit module walks through SG list 1010 in a coordinated manner with a bitmap walker circuit module that walks through bitmap 1030. One or more counters may be maintained to keep track of a current host address pointer and to keep track of a current host SG element size.

The first SG element 1012 is read in conjunction with the first bit '1' in bitmap 1030 (see the binary representation of the bitmap). The '1' in the bitmap indicates that the data is to be obtained from the cache. Accordingly, a new SG element 1042 is generated in the new SG list 1040 for the storage device. A null address in the form of 0xFFFF is written to new SG element 1042, with size of 512, indicating to the DMA engine that this data retrieved from the storage device should be trashed. Accordingly, new SG element 1042 is a trashing SG element.

Further, a valid address of 0x1000 from the host SG element 1012 is written to new SG element 1052 for the SG list for the cache, indicating to the DMA engine that this data should be retained, with a size of 512.

Since the size of the fragment of first SG element 1012 is 512 bytes and thus matches the bitmap sector size of 512 bytes a counter may indicate that a shift in the pointer bitmap is needed. The bitmap pointer may be shifted to the next bit in the bitmap, in this case a '0', and the counter may be reset to zero.

Next, second SG element 1014 is read in conjunction with the second bit '0' in bitmap 1030. The '0' in the bitmap indicates that the data is to be obtained from the storage device. Accordingly, another new SG element 1044 is generated in the new SG list 1040 for the storage device. A valid address of 0x2000 from the host SG element 1014 is written to new SG element 1044 for the SG list for the storage device, with the size of 256, indicating to the DMA engine that this data should be retained. The counter is incremented from zero to 256. In addition, a new SG element 1054 is generated in the new SG list 1050 for the cache with a null address in the form of 0xFFFF, indicating to the DMA engine that this data retrieved from the cache should be trashed, and a size of 512. New SG element 1054 is therefore a trashing SG element.

Since the counter value has not yet reached the bitmap sector size of 512 (counter is currently at 256), bitmap pointer 1030 is not shifted.

The next SG element, third SG element 1016, is read from the host SG list 1010 in conjunction with the '0' bit from bitmap 1030. The size of the data fragment associated with third SG element 1016 is indicated as being 768 bytes which is more than the 256 bytes remaining before the counter reaches the sector size of 512. Accordingly, another new SG element 1046 is generated in the new SG list 1040 for the storage device. A valid address of 0x3000 from the host SG element 1014 is written to new SG element 1046 for the SG list for the storage device, indicating to the DMA engine that this data should be retained. However, the size written to SG element 1046 is only 256 and not 768 since the counter indicates that only 256 bytes of the 768 bytes data fragment associated with third SG element 1016 corresponds to the current bitmap pointer value of '0'. The bitmap pointer will then need to be shifted.

In addition, a new SG element 1056 is generated in the new SG list 1050 for the cache with a null address in the form of 0xFFFF, indicating to the DMA engine that this data retrieved from the cache should be trashed, and a size of 256. New SG element 1056 is a trashing SG element.

Accordingly, the counter is incremented from 256 to 512 and reset to zero. The pointer is shifted to the next bit, here a '1', indicating that the data is to be obtained from the cache.

A new SG element 1058 is generated in the new SG list 1050 for the cache with a valid address of 0x3100, indicating to the DMA engine that this data should be retained, with a size of 512. The size of 512 bytes corresponds to the remainder of the data fragment of third SG element 1016 (768−256=512). Further, the address 0x3100 is 0x100 (hex) higher than the address in third SG element 1016 in host SG list 1010. The 0x100 hex value is equivalent to 256 in decimal format, which corresponds to the size of the fragment associated with new SG element 1046 in the SG list 1040 for the storage device.

Further, a new SG element 1048 is generated in the new SG list 1040 for the storage device with a null address in the form of 0xFFFF, indicating to the DMA engine that this data retrieved from the storage device should be trashed, and a size of 512. New SG element 1048 is a trashing SG element. In addition, an EOL flag is written in each of SG elements 1048 and 1058 indicating that these SG elements are the last SG elements in their respective SG lists 1040 and 1050.

The one or more new SG lists 1040, 1050 may then be provided to DMA engine circuit module 750, as previously described. DMA engine circuit module 750 performs the DMA read or write based on the new SG list or lists to transfer the data between the host and the storage device.

Figure 11:
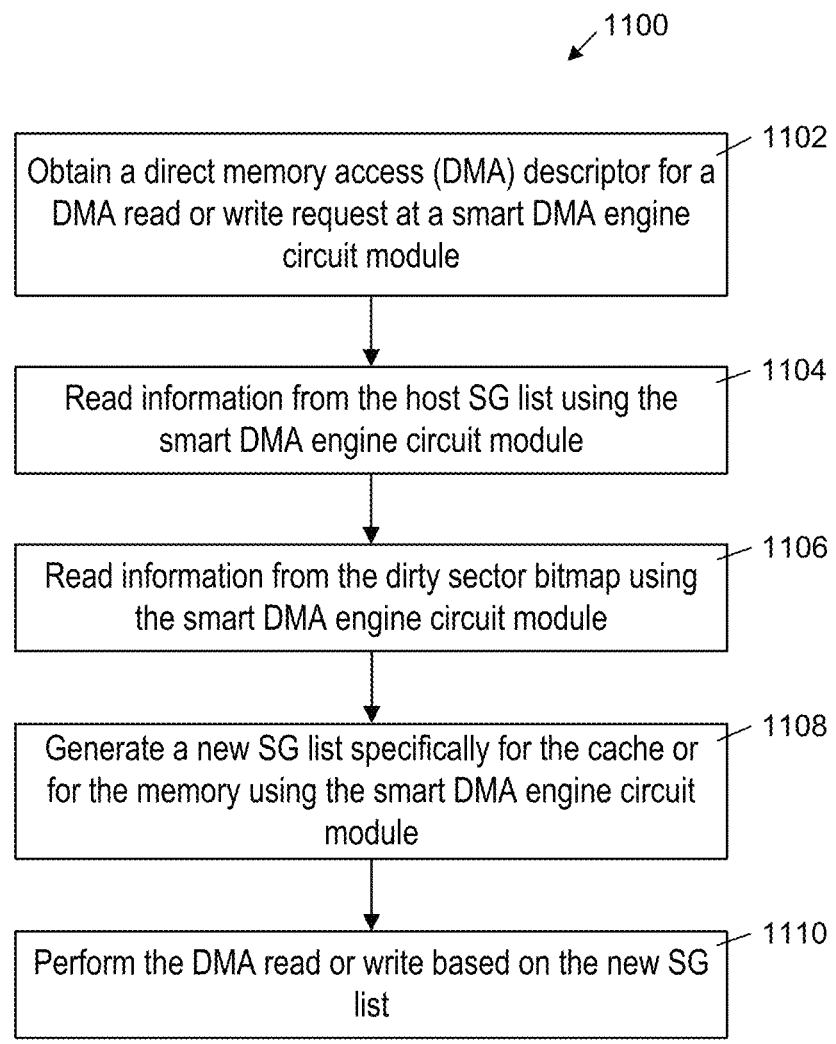
FIG. 11 is a flow diagram of an example process for generating a new SG list.

FIG. 11 is an example process 1100 according to the present disclosure. One or more parts or all of process 1100 may executed by a smart DMA engine circuit module according to the present disclosure.

The process begins at block 1102 where a DMA descriptor is obtained for a DMA read or write request to a storage device such as storage device 420 of FIG. 6. The descriptor may be obtained by a descriptor fetch circuit module. The DMA descriptor may include first address information for a host SG list and second address information for a dirty sector bitmap. The host SG list may comprise one or more SG elements each including address information and size information for a fragment of memory covered by the DMA read or write request. The dirty sector bitmap may indicate dirty sectors in a cache of the storage controller having invalid data relative to corresponding sectors in the storage device.

The process then proceeds to block 1104, where information is read from the host SG list. The information may be read by a host SG list walker circuit module.

The process then proceeds to block 1106, where information is read from the dirty sector bitmap. The information may be read by a bitmap walker circuit module.

In some embodiments, the reading in blocks 1104 and 1106 may be performed partially or wholly in parallel.

The process then proceeds to block 1108, where a new SG list is generated specifically for the cache or for the storage device. In an embodiment, at least two new SG lists are generated, namely at least one new SG list specifically for the cache and at least one new SG list specifically for the storage device. The one or more new SG lists may be generated by a new SG list generator circuit module. The new SG list may comprise a SG element for each fragment or portion of fragment of memory covered by the DMA read or write request comprising valid data to be read from the respective one of the cache and the storage device. The new SG list may be generated based on the information read from the host SG list and the dirty sector bitmap. The new SG list may be different than the host SG list.

Further, in an embodiment, at least one trashing SG element may be generated in the new SG list for a fragment or portion of fragment of memory covered by the DMA read or write request comprising invalid data in the respective one of the cache or the storage device. The trashing SG element indicates that the invalid data read from the one of the cache and the storage device is to be trashed (i.e. discarded) by the storage controller.

The process then proceeds to block 1110, where the DMA read or write is performed based on the one or more new SG lists. The DMA read or write may be performed by a DMA state machine circuit module.

Figure 12:
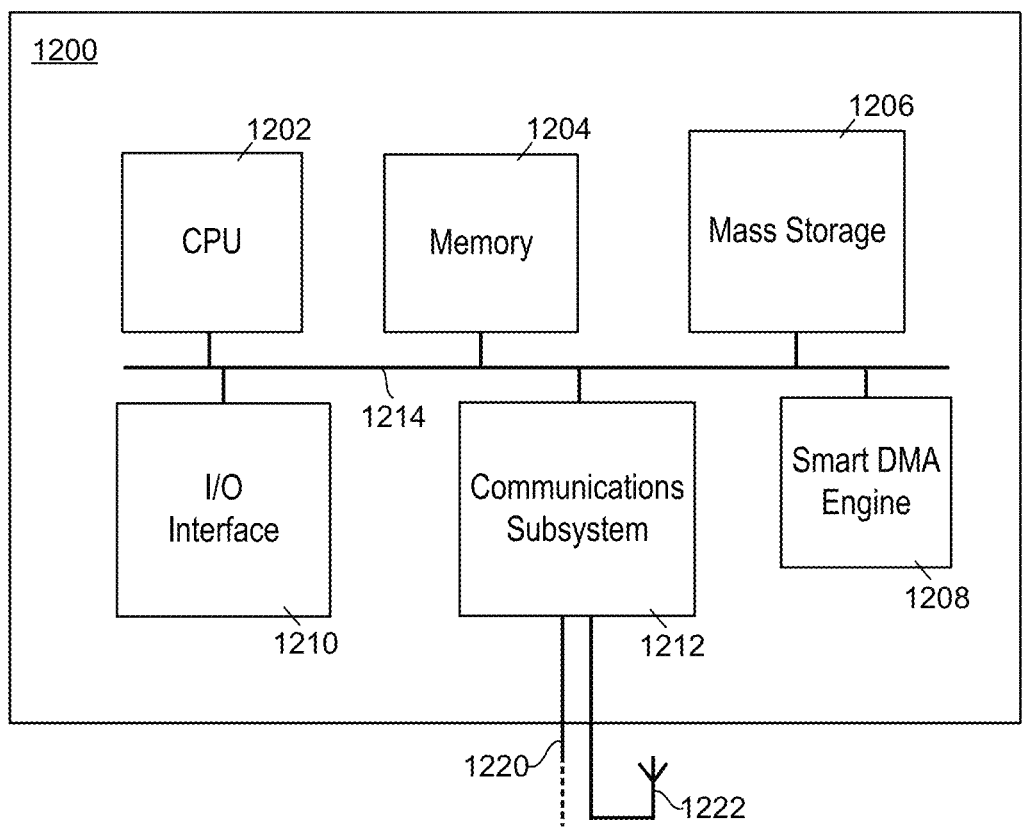
FIG. 12 is a block diagram of an example electronic device.

FIG. 12 is a block diagram of an example electronic device 1200 that may be used in implementing one or more aspects or components of embodiments according to the present disclosure. In an embodiment, electronic device 1200 may be in the form of a storage controller such as storage controller 600 of FIG. 6.

The electronic device 1200 may include one or more of a central processing unit (CPU) 1202, memory 1204, a mass storage device 1206, a smart DMA engine 1208, an input/output (I/O) interface 1210, and a communications subsystem 1212. One or more of the components or subsystems of electronic device 1200 may be interconnected by way of one or more buses 1214 or in any other suitable manner.

The smart DMA engine 1208 may be a circuit or device according to the present disclosure, including but not limited to smart DMA engine circuit module 614 or smart DMA engine 700.

The bus 1214 may be one or more of any type of several bus architectures including a memory bus, storage bus, memory controller bus, peripheral bus, or the like. The CPU 1202 may comprise any type of electronic data processor. The memory 1204 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 1206 may comprise any type of storage device configured to store data, programs, and other information and to make the data, programs, and other information accessible via the bus 1214. The mass storage device 1206 may comprise one or more of a solid state drive, hard disk drive, a magnetic disk drive, an optical disk drive, or the like. In some embodiments, data, programs, or other information may be stored remotely, for example in the "cloud". Electronic device 1200 may send or receive information to the remote storage in any suitable way, including via communications subsystem 1212 over a network or other data communication medium.

The I/O interface 1210 may provide interfaces to couple one or more other devices (not shown) to the electronic device 1200. The other devices may include but are not limited to one or more of a host computing device, such as host computer 102 of FIG. 1, and a storage device or storage system, such as storage device 106 of FIG. 1. I/O interface 1210 may implement PCI or PCIe for connecting to a host computer. The storage device may comprise one or more storage devices, for example hard disk drives and/or solid state drives. In an embodiment, the storage devices may implement redundant array of independent disks (RAID) technology. In an embodiment, electronic device 1200 may implement a RAID storage controller. Furthermore, additional or fewer interfaces may be utilized.

A communications subsystem 1212 may be provided for one or both of transmitting and receiving signals. Communications subsystems may include any component or collection of components for enabling communications over one or more wired and wireless interfaces. These interfaces may include but are not limited to SAS, SCSI, ATA, SATA, USB, Ethernet, high-definition multimedia interface (HDMI), Firewire (e.g. IEEE 1394), Thunderbolt™, WiFi™ (e.g. IEEE 802.11), WiMAX (e.g. IEEE 802.16), Bluetooth™, or Near-field communications (NFC), as well as GPRS, UMTS, LTE, LTE-A, dedicated short range communication (DSRC), and IEEE 802.11. Communication subsystem 1212 may include one or more ports or other components 1220 for one or more wired connections. Additionally or alternatively, communication subsystem 1212 may include one or more transmitters (not shown), receivers (not shown), and/or antenna elements 1222.

The electronic device 1200 of FIG. 12 is merely an example and is not meant to be limiting. Various embodiments may utilize some or all of the components shown or described. Some embodiments may use other components not shown or described but known to persons skilled in the art.

Although embodiments according to the present disclosure relate to storage controller technologies, this is not intended to be limiting. The teachings according to the present disclosure are intended to apply to other technologies and applications.

As used herein, the terms "connected", "connection", and "coupled" generally mean that the referred to elements are electrically connected, whether directly or indirectly, such that an electrical current may flow from one to the other. The connection may include a direct conductive connection, an inductive connection, a capacitive connection, and/or any other suitable electrical connection. Intervening components may be present.

In the present disclosure, well-known electrical structures and circuits are shown in block diagram form in order not to obscure the understanding. For example, specific details are not necessarily provided for every embodiment as to whether the embodiment is implemented as a software routine, hardware circuit, firmware, or a combination thereof.

Further, references to particular data sizes, such as a 32 bit DWORD, are used only as examples and are not meant to be limiting.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods described herein are not meant to be limiting. Methods comprising different steps, different number of steps, and/or different ordering of steps are also contemplated.

The above-described embodiments are intended to be examples only. Alterations, modifications and variations can be effected to the particular embodiments by those of skill in the art without departing from the scope, which is defined solely by the claims appended hereto.

The invention claimed is:

1. A smart direct memory access (DMA) engine module for a storage controller, the module comprising:
   a descriptor fetch circuit module for obtaining a DMA descriptor for a DMA read or write request to a storage device, the DMA descriptor including first address information for a host scatter-gather (SG) list and second address information for a dirty sector bitmap, the host SG list comprising one or more SG elements each including address information and size information for a fragment of memory covered by the DMA read or write request, and the dirty sector bitmap indicating dirty sectors in a cache of the storage controller having invalid data relative to corresponding sectors in the storage device;
   a host SG list walker circuit module configured to read information from the host SG list;
   a bitmap walker circuit module configured to read information from the dirty sector bitmap;
   a new SG list generator circuit module configured to generate at least one new SG list for the cache or for the storage device, the new SG list comprising a SG element for each fragment or portion of fragment of memory covered by the DMA read or write request comprising valid data to be read from the respective one of the cache or the storage device, the new SG list being generated based on the information read from the host SG list and the dirty sector bitmap, the new SG list being different than the host SG list; and
   a DMA engine circuit module configured to perform the DMA read or write based on the at least one new SG list.

2. The smart DMA engine module of claim 1, wherein the new SG list generator circuit module is further configured to generate at least one trashing SG element in the new SG list for a fragment or portion of fragment of memory covered by the DMA read or write request comprising invalid data in the respective one of the cache or the storage device, the trashing SG element indicating that the invalid data read from the one of the cache and the storage device is to be trashed.

3. The smart DMA engine module of claim 2, wherein the DMA engine circuit module is configured to perform the DMA read or write in part by trashing invalid data read from the one of the cache and the storage device in response to the at least one trashing SG element in the at least one new SG list.

4. The smart DMA engine module of claim 1, further comprising a main circuit module in communication with and for controlling and coordinating the operations of the descriptor fetch circuit module, the host SG list walker circuit module, the bitmap walker circuit module, and the new SG list generator circuit module, the main circuit module operable to generate the at least one new SG list for the cache or for the storage device by indicating to the bitmap walker circuit module to load the first SG element of the host SG list and start walking, indicating to the bitmap walker circuit module to load the dirty sector bitmap, initialize calculations, and start shifting, and indicating to the DMA engine circuit module to start performing the DMA read or write.

5. The smart DMA engine module of claim 1, wherein the new SG list generator circuit module is configured generate a new SG list for the cache and a new SG list for the storage device.

6. The smart DMA engine module of claim 5, wherein the DMA descriptor comprises a bit offset value indicating the start of bitmap information for the DMA read or write request within the dirty sector bitmap.

7. The smart DMA engine module of claim 1, wherein the DMA descriptor comprises a trash polarity bit value indicating whether dirty sectors in the cache are indicated with a value of 0 or 1 in the dirty sector bitmap, and wherein the new SG list generator circuit module is configured to use the trash polarity bit value when generating the at least one new SG list.

8. The smart DMA engine module of claim 1, wherein the DMA descriptor comprises a bitmap sector size value indicating the size of sectors in the dirty sector bitmap.

9. The smart DMA engine module of claim 1, wherein the descriptor fetch circuit module is configured to obtain the DMA descriptor directly from a main memory of the storage controller.

10. A method for execution by a smart direct memory access (DMA) engine module for a storage controller, the method comprising:
    obtaining a DMA descriptor for a DMA read or write request to a storage device, the DMA descriptor including first address information for a host scatter-gather (SG) list and second address information for a dirty sector bitmap, the host SG list comprising one or more SG elements each including address information and size information for a fragment of memory covered by the DMA read or write request, and the dirty sector bitmap indicating dirty sectors in a cache of the storage controller having invalid data relative to corresponding sectors in the storage device;
    reading information from the host SG list;
    reading information from the dirty sector bitmap;
    generating at least one new SG list for the cache or for the storage device, the new SG list comprising a SG element for each fragment or portion of fragment of memory covered by the DMA read or write request comprising valid data to be read from the respective one of the cache or the storage device, the new SG list being generated based on the information read from the host SG list and the dirty sector bitmap, the new SG list being different than the host SG list; and
    performing the DMA read or write based on the at least one new SG list.

11. The method of claim 10, further comprising generating at least one trashing SG element in the new SG list for a fragment or portion of fragment of memory covered by the DMA read or write request comprising invalid data in the respective one of the cache or the storage device, the trashing SG element indicating that the invalid data read from the one of the cache and the storage device is to be trashed.

12. The method of claim 11, further comprising performing the DMA read or write in part by trashing invalid data read from the one of the cache and the storage device in response to the at least one trashing SG element in the at least one new SG list.

13. The method of claim 10, further comprising obtaining the DMA descriptor directly from a main memory of the storage controller.

14. The method of claim 13, wherein the smart DMA engine module is separate from a central processing unit of the storage controller.

15. A storage controller comprising;
    a host interface adapter configured to be coupled to a host computer;
    a storage interface adapter configured to be coupled to a storage device external to the storage controller;
    a processor coupled to the host interface adapter and to the storage interface adapter, the processor configured to control and access the storage device based on read and write commands sent from the host computer;
    a cache;
    a memory; and
    a smart direct memory access (DMA) engine module comprising:
        a descriptor fetch circuit module for obtaining a DMA descriptor for a DMA read or write request to the storage device, the DMA descriptor including first address information for a host scatter-gather (SO) list and second address information for a dirty sector bitmap, the host SG list comprising one or more SO elements each including address information and size information for a fragment of memory covered by the DMA read or write request, and the dirty sector bitmap indicating dirty sectors in a cache of the storage controller having invalid data relative to corresponding sectors in the storage device,
        a host SG list walker circuit module configured to read information from the host SG list,
        a bitmap walker circuit module configured to read information from the dirty sector bitmap,
        a new SG list generator circuit module configured to generate at least one new SG list for the cache or for the storage device, the new SG list comprising a SG element for each fragment or portion of fragment of memory covered by the DMA read or write request comprising valid data to be read from the respective one of the cache or the storage device, the new SG list being generated based on the information read from the host SG list and the dirty sector bitmap, the new SG list being different than the host SG list, and
        a DMA engine circuit module configured to perform the DMA read or write based on the at least one new SG list.

16. The storage controller of claim 15 wherein the DMA engine module is operable to start performing the DMA read or write after the new SG list generator circuit module begins generating the at least one new SG list and before the new SG list generator finishes generating the at least one new SG list.

17. The storage controller of claim 16 wherein the DMA engine module includes a main circuit module that is coupled to the DMA engine module, the main circuit module operable for managing parallel optimization to control when the DMA engine module starts performing the DMA read or write.

18. The storage controller of claim 16 wherein the DMA engine module includes a main circuit module that is coupled to the DMA engine module, the main circuit module separate from the processor and operable independently of the processor to generate at least one new SG list for the cache or for the storage device by indicating to the bitmap walker circuit module to load the first SG element of the host SG list and start walking, indicating to the bitmap walker circuit module to load the dirty sector bitmap, initialize calculations, and start shifting, and indicating to the DMA engine circuit module to start performing the DMA read or write.

19. The storage controller of claim 18 further comprising a bus coupled to the host interface adapter, the storage interface adapter, the processor, the cache and the memory,
wherein the host SG list walker circuit is coupled to the bus and is operable independently of the processor, in response to input from the main circuit module to initiate read cycles to pull in individual SG element data from the bus.

20. The storage controller of claim 18 wherein the smart DMA engine module is separate from the processor and wherein the descriptor fetch circuit module is operable independently of the processor to obtain the DMA descriptor directly from the memory in response to input from the main circuit module.

* * * * *

UNITED STATES PATENT AND TRADEMARK OFFICE
CERTIFICATE OF CORRECTION

PATENT NO. : 10,915,478 B2
APPLICATION NO. : 16/385367
DATED : February 9, 2021
INVENTOR(S) : Craig Chafin and Arunkumar Sundaram Page 1 of 1

It is certified that error appears in the above-identified patent and that said Letters Patent is hereby corrected as shown below:

In the Claims

Column 22, Line 39, please replace "SO" with --SG--.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*